United States Patent
Wakabayashi et al.

(10) Patent No.: US 8,576,729 B2
(45) Date of Patent: Nov. 5, 2013

(54) COMMUNICATION METHOD FOR POINT-TO-MULTIPOINT COMMUNICATION SYSTEM AND SUBSIDIARY TRANSMISSION APPARATUS FOR THE SAME SYSTEM

(75) Inventors: Jun Wakabayashi, Kawasaki (JP); Masakazu Bamba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1097 days.

(21) Appl. No.: 11/498,049

(22) Filed: Aug. 3, 2006

(65) Prior Publication Data
US 2007/0223384 A1    Sep. 27, 2007

(30) Foreign Application Priority Data
Mar. 24, 2006   (JP) ................................ 2006-083593

(51) Int. Cl.
*G01R 31/08* (2006.01)
*G06F 11/00* (2006.01)
*H04J 1/16* (2006.01)
*H04L 1/00* (2006.01)
*H04B 10/00* (2013.01)

(52) U.S. Cl.
USPC ............................ 370/248; 370/242; 398/107

(58) Field of Classification Search
USPC ...................... 307/396, 241, 241.1, 242, 248; 398/107; 370/396, 241, 241.1, 242, 370/248
See application file for complete search history.

(56) References Cited

U.S. PATENT DOCUMENTS

| | | | |
|---|---|---|---|
| 5,734,641 A * | 3/1998 | Kawasaki et al. | 370/242 |
| 6,424,629 B1 * | 7/2002 | Rubino et al. | 370/241.1 |
| 6,594,237 B1 * | 7/2003 | Kiuchi et al. | 370/250 |
| 6,801,504 B1 * | 10/2004 | Ito | 370/242 |
| 6,868,066 B1 * | 3/2005 | Fujita | 370/236.2 |
| 7,167,444 B1 * | 1/2007 | Afferton | 370/222 |
| 2001/0019536 A1 * | 9/2001 | Suzuki | 370/226 |
| 2002/0009091 A1 * | 1/2002 | Taniguchi | 370/403 |
| 2002/0093971 A1 * | 7/2002 | Yasuo et al. | 370/403 |
| 2003/0126285 A1 * | 7/2003 | Toyoyama et al. | 709/238 |
| 2004/0170128 A1 * | 9/2004 | Takamichi | 370/245 |
| 2005/0078607 A1 * | 4/2005 | Bellato et al. | 370/248 |
| 2005/0185652 A1 * | 8/2005 | Iwamoto | 370/395.1 |

(Continued)

FOREIGN PATENT DOCUMENTS

JP    61-161843    7/1986

*Primary Examiner* — Ayaz Sheikh
*Assistant Examiner* — Hoang-Chuong Vu
(74) *Attorney, Agent, or Firm* — Staas & Halsey LLP

(57) ABSTRACT

The communication method and the subsidiary transmission apparatus for a point-to-multipoint communication system in which the subsidiary transmission apparatus autonomously establishes point-to-multipoint communication between one main transmission apparatus and multiple subsidiary transmission apparatuses, without manually operating switches of the subsidiary transmission apparatuses. The subsidiary transmission apparatus generates, during the absence of a transmission request to the main transmission apparatus, an alarm signal to be transmitted to the main transmission apparatus through an upstream line, and the main transmission apparatus sends, while receiving the alarm signal through the upstream line, a specified notification signal, which is to be sent out in response to the reception of the alarm signal, to a downstream line, and the subsidiary transmission apparatus evaluates the state of use of the upstream line depending on the presence or absence of reception of the notification signal from the downstream line.

10 Claims, 9 Drawing Sheets

(56) References Cited

U.S. PATENT DOCUMENTS

| | | | |
|---|---|---|---|
| 2005/0185954 A1* | 8/2005 | Sadananda et al. | 398/5 |
| 2005/0249124 A1* | 11/2005 | Elie-Dit-Cosaque et al. | 370/242 |
| 2006/0268730 A1* | 11/2006 | Duan et al. | 370/252 |
| 2006/0274785 A1* | 12/2006 | Kunimatsu et al. | 370/466 |
| 2007/0053298 A1* | 3/2007 | Ke et al. | 370/236.2 |
| 2007/0147259 A1* | 6/2007 | Smith | 370/242 |
| 2007/0212065 A1* | 9/2007 | Shin et al. | 398/45 |
| 2008/0285439 A1* | 11/2008 | Lemoine et al. | 370/221 |
| 2009/0202239 A1* | 8/2009 | Holness et al. | 398/33 |
| 2009/0323538 A1* | 12/2009 | Bakhru | 370/242 |

\* cited by examiner

THROUGH MODE

ADD MODE

FIG. 4

| INPUT #1 \ INPUT #2 | No ALM | AIS |
|---|---|---|
| No ALM | THROUGH | THROUGH |
| AIS | ADD | THROUGH |

COMMUNICATION METHOD FOR POINT-TO-MULTIPOINT COMMUNICATION SYSTEM AND SUBSIDIARY TRANSMISSION APPARATUS FOR THE SAME SYSTEM

CROSS REFERENCE TO RELATED APPLICATIONS

This application is based on and hereby claims priority to Japanese Application No. 2006-83593 filed on Mar. 24, 2006 in Japan, the contents of which are hereby incorporated by reference.

BACKGROUND OF THE INVENTION (1) Field of the Invention

The present invention relates to a communication method in a point-to-multipoint communication system and a subsidiary transmission apparatus for the same system. The invention relates to a communication method and a subsidiary transmission apparatus suitable for use in SONET (Synchronous Optical Network)/SDH (Synchronous Digital Hierarchy) transmission systems.

(2) Description of the Related Art

At present, as a user network interface for realizing the B-ISDN (Broadband Aspects of Integrated Services Digital Network), the SONET (Synchronous Optical Network)/SDH (Synchronous Digital Hierarchy) is standardized as international standards for the purpose of standardization of existing digital hierarchies of countries world-wide.

As a mode of communication network using the SONET/SDH, there is a point-to-multipoint communication system as shown in FIG. 9.

As shown in FIG. 9, the previous point-to-multipoint communication system 600 includes: one main transmission apparatus (hereinafter will be also called the "main station") 100; and N-number (N is an integer greater than 1) (in the present example, three) of subsidiary transmission apparatuses (hereinafter will be also called the "subsidiary station") 200A, 200B, and 200C (simply called the "subsidiary station 200" when individual apparatuses are not distinguished).

In the point-to-multipoint communication system 600, when one-to-N inter-transmission apparatus communication (that is, communication from the main station 100 to the subsidiary station 200) is performed, the main station 100 broadcasts (or multicasts) the same signal to be transmitted to the subsidiary stations 200 through a sending line (downstream line) 120, whereby the signal reaches the signal terminal unit 400. As a result, the main station 100 is capable of communicating (transmitting) with all the subsidiary stations 200 without any trouble.

On the other hand, in the point-to-multipoint communication system 600, when N-to-1 inter-transmission apparatus communication (that is, communication from the subsidiary stations 200 to the main station 100) is performed, exclusive control needs to be carried out for communication (transmission) because the subsidiary stations 200 share a returning line (upstream line) 210. To realize such exclusive control, at present, a maintenance engineer needs to manually perform a switch operation of the switch unit 500 of each of the subsidiary stations 200, thereby controlling the line connection state between the main station 100 and the subsidiary stations 200, so that a signal to be sent from the subsidiary stations 200 can reach the signal terminal unit 300 of the main station 100.

With the above-described method, for manually controlling a switch state of the switch unit 500 of each of the subsidiary stations 200, the maintenance engineer must spend a lot of time and effort. Thus, when a number of subsidiary stations 200 need to be managed, the manual management is not a down-to-earth control method. In addition, in the above-described method, when a transmission request to the main station 100 is generated in any of the subsidiary stations 200, it is impossible to perform lines witch control (switch control of the switch unit 500) immediately, so that the usability of the lines can be affected.

Thus, to resolve the above problem, an automatic line control method performed in cases where N-to-1 inter-transmission apparatus communication is carried out is considered.

For example, the following patent document 1 discloses a communication method in which a signal from each subsidiary station is super imposed using an OR circuit to be sent to the main station. If only one subsidiary station is sending significant information, transmission information of the subsidiary station is inevitably received by the main station.

[Patent Document 1] Japanese Patent Application Laid-open No. SHO 61-161843

According to the above-described previous art, when exclusive control is performed among the subsidiary transmission apparatuses, dedicated lines, which are necessary for the exclusive control, need to be installed. Hence, if the scale of the communication system is increased due to an increase in the number of subsidiary stations, not only the subsidiary stations and the main signal transmission path but also such dedicated lines need to be installed, so costs are increased. In addition, the number of lines needed is also increased, and the reliability of the above communication system and the convenience of maintenance may deteriorate.

SUMMARY OF THE INVENTION

With the foregoing problems in view, it is an object of the present invention to make it possible to autonomously establish point-to-multipoint communication between one main transmission apparatus and multiple subsidiary transmission apparatuses, without checking the state of use of lines and manual operation of switches of the subsidiary transmission apparatuses. For example, utilizing signals such as an AIS (Alarm Indication Signal), which is an ALM (alarm) signal that has already been defined in SONET/SDH, and an RFI (Remote Failure Indicator), which is to be sent in response to the AIS, line switching is automatically performed, thereby making possible exclusive control in communication from subsidiary transmission apparatuses to the main transmission apparatus without the necessity of the above-mentioned dedicated lines.

In order to accomplish the above object, the present invention is characterized in that the following communication method for a point-to-multipoint communication system and the following subsidiary transmission apparatus for the same system are applied.

(1) As a generic feature, there is provided a communication method for a point-to-multipoint communication system including: one main transmission apparatus; a pair of bidirectional lines connected to the main transmission apparatus; and a plurality of subsidiary transmission apparatus connected to the bidirectional communication lines, which subsidiary transmission apparatus are capable of performing point-to-multipoint communication with the main transmission apparatus through the bidirectional lines, the communication method comprising: on the subsidiary transmission apparatus, generating, during the absence of a transmission request to the main transmission apparatus, an alarm signal to be transmitted to the main transmission apparatus through an upstream line of the bidirectional lines, on the main transmission apparatus, sending, while receiving the alarm signal through the upstream line, a specified notification signal, which is to be sent out in response to the reception of the alarm signal, to a downstream line of the bidirectional lines, and on the subsidiary transmission apparatus, evaluating a state of use of the upstream line depending on the presence or absence of reception of the notification signal from the downstream line.

(2) As a preferred feature, the subsidiary transmission apparatus decides that the upstream line is usable, while the subsidiary transmission apparatus is receiving the notification signal through the downstream line.

(3) As another generic feature, there is provided a subsidiary transmission apparatus for a point-to-multipoint communication system including: one main transmission apparatus; a pair of bidirectional lines connected to the main transmission apparatus; and a plurality of subsidiary transmission apparatus connected to the bidirectional communication lines, which subsidiary transmission apparatus are capable of performing point-to-multipoint communication with the main transmission apparatus through the bidirectional lines, the subsidiary transmission apparatus comprising: generating means which generates, during the absence of a transmission request to the main transmission apparatus, an alarm signal to be transmitted to the main transmission apparatus through an upstream line of the bidirectional lines; and controlling means which (i) evaluates a state of use of the upstream line depending on whether or not a specified notification signal, which the main transmission apparatus should send to a downstream line of the bidirectional line in response to reception of the alarm signal, is received from the downstream line, and (ii) controls sending of a transmission signal addressed to the main transmission apparatus out to the upstream line.

(4) As a preferred feature, the generating means includes: an alarm generating unit for generating the alarm signal; a transmission signal generating unit for generating the transmission signal addressed to the main transmission apparatus; and a switch unit having (i) a through mode in which a signal over the upstream line is made to pass through and (ii) an add mode in which either an alarm signal generated by the alarm generating unit or a transmission signal addressed to the main transmission apparatus generated by the transmission signal generating unit is added to the upstream line, wherein the control means includes: a notification signal reception detecting unit which detects the presence or absence of the reception of the notification signal from the downstream line, wherein when the notification signal reception detecting unit detects the reception of the notification signal, the alarm signal is stopped being added to the upstream line, and the switch unit is switched into the add mode so that the transmission signal generated by the transmission signal generating unit is added to the upstream line.

(5) As a preferred feature, the alarm signal is an AIS (Alarm Indication Signal) defined by the SDH transmission scheme, and the notification signal is an RFI (Remote Failure Indicator) signal defined by the SDH transmission scheme.

The above-described invention guarantees at least any of the following effects and benefits.

(1) In the above point-to-multipoint communication system, the subsidiary transmission apparatus generates, during the absence of a transmission request to the main transmission apparatus, an alarm signal to be transmitted to the main transmission apparatus through an upstream line of the bidirectional lines. Further, the main transmission apparatus sends, while receiving the alarm signal through the upstream line, a specified notification signal, which is to be sent out in response to the reception of the alarm signal, to a downstream line of the bidirectional lines. Still further, the subsidiary transmission apparatus evaluates the state of use of the upstream line depending on the presence or absence of reception of the notification signal from the downstream line. Accordingly, it is possible for the object subsidiary station to simply and easily evaluate whether or not another subsidiary station is using the upstream line, without the necessity of complicated negotiation processing.

(2) Further, the object subsidiary transmission apparatus receives the notification signal through the downstream line. When deciding that the upstream line is usable, the object subsidiary transmission apparatus sends a transmission signal (data) addressed to the main transmission apparatus. Thus, a communication path (a communication path utilizing the above-mentioned upstream line) is established without the necessity of a maintenance engineer who manually operates the switch of the subsidiary transmission apparatus while checking the state of use of the upstream line. That is, for example, the switch unit of the subsidiary transmission apparatus is switched between the through mode, in which a signal of the upstream line is made to pass through, and the add mode, in which either the alarm signal or the transmission (data) signal is added to the upstream line. As a result, a communication path (a path of the upstream line) between the subsidiary transmission apparatus and the main transmission apparatus is automatically established.

(3) Here, by utilizing an AIS defined in the SDH transmission scheme as the alarm signal, and by utilizing an RFI signal defined in the SDH transmission scheme as the notification signal, switch control of the switch unit of the subsidiary transmission apparatus can be performed without the necessity of providing a dedicated line for transceiving a control signal for the switch unit.

Other objects and further features of the present invention will be apmain from the following detailed description when read in conjunction with the accompanying drawings.

BRIEF DESCRIPTION OF THE DRAWINGS

FIG. 4 is a table for describing operation patterns (modes) of the switch unit;

DESCRIPTION OF THE PREFERRED EMBODIMENT(S)

One preferred embodiment of the present invention will now be described with reference to the relevant accompanying drawings.

Figure 1:
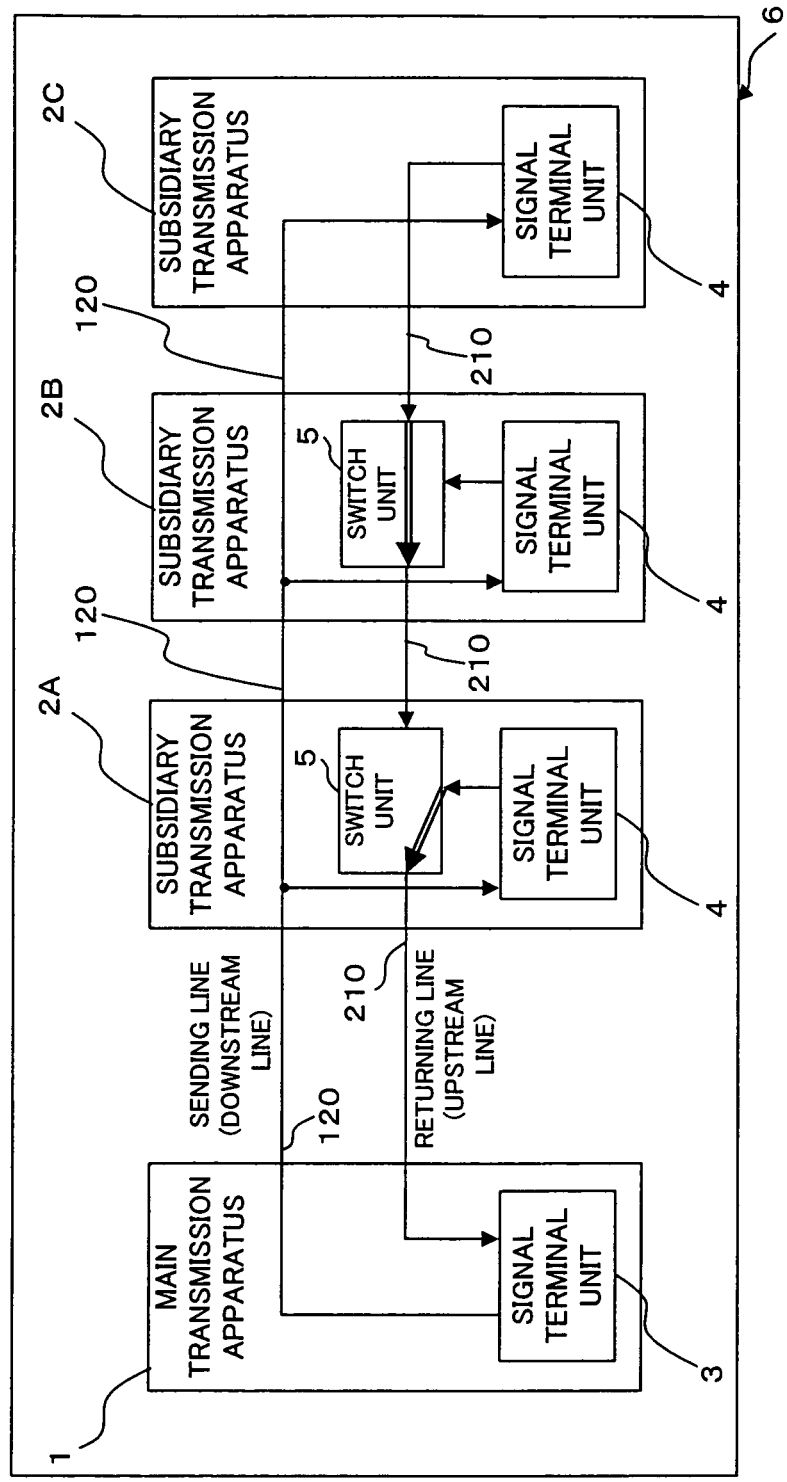
FIG. 1 is a block diagram illustrating a construction of point-to-multipoint communication system according to one preferred embodiment of the present invention.

[A] One Preferred Embodiment:

FIG. 1 is a block diagram illustrating a construction of a point-to-multipoint communication system according to one preferred embodiment of the present invention.

As shown in FIG. 1, the point-to-multipoint communication system (hereinafter will be also simply called the "communication system") 6 of the present embodiment includes one main transmission apparatus (hereinafter will be also called the "main station") 1 and N-number (N is an integer greater than one) (in this example, three) of subsidiary transmission apparatuses (hereinafter will be also called the "subsidiary stations") 2A, 2B, and 2C (note that these are called "subsidiary station 2" in cases where there is no necessity of distinguishing there among). The main station land the subsidiary stations 2 are interconnected through a pair of bidirectional lines composed of the sending line (downstream line) 120, which is adapted to transmit data from the main station 1 to the subsidiary stations 2, and the returning line (upstream line) 210, which is adapted to transmit data from the subsidiary stations 2 to the main station 1. This arrangement makes point-to-multipoint communication available.

The main station 1 includes a signal terminal unit 3 and other non-illustrated constituents (a control device such as a CPU, a memory, etc.). Each of the subsidiary stations 2 has, for example, a signal terminal unit 4, a switch unit 5, and other non-illustrated constituents (a control device such as a CPU, a memory, etc.). As shown in FIG. 1, a switch unit 5 can be omitted in the subsidiary station (here, subsidiary station 2C) arranged at the terminal of the communication system 6. When the switch unit 5 is not omitted, the subsidiary station 2C has the same construction as that of the other subsidiary stations (here, the subsidiary stations 2A and 2B).

Here, the main station 1 sends a variety of types of data (for example, contents data such as moving pictures, music, documents, etc. and control data such as an RFI signal) generated by the signal terminal unit 3 to the multiple subsidiary stations 2 through the downstream line 120, and also receives transmission data (a transmission signal) sent from the subsidiary stations 2 through the upstream line 210. Further, the signal terminal unit 3 generates the above-mentioned variety of types of data to be transmitted to the subsidiary stations 2, and performs specified processing on the transmission data (contents data such as moving pictures, music, documents, etc. and control data such as an alarm signal) received from the subsidiary stations 2.

The subsidiary stations 2 receive the above-mentioned variety of types of data sent from the main station 1 through the downstream line 120, and also send the above-mentioned transmission data generated by the signal terminal unit 4 to the main station 1 through the upstream line 210. The signal terminal unit 4 not only generates the above-mentioned transmission data to be sent to the main station 1 but also terminates the signals received from the main station 1. The signal terminal unit 4 extracts the variety of types of data from the terminated signals and processes the extracted data.

The switch unit 5 selects one of the two modes (the through mode and the add mode; described later) thereof and switches the connection state (communication path) between the main station 1 and the subsidiary stations 2 in the communication system 6.

Figure 2:
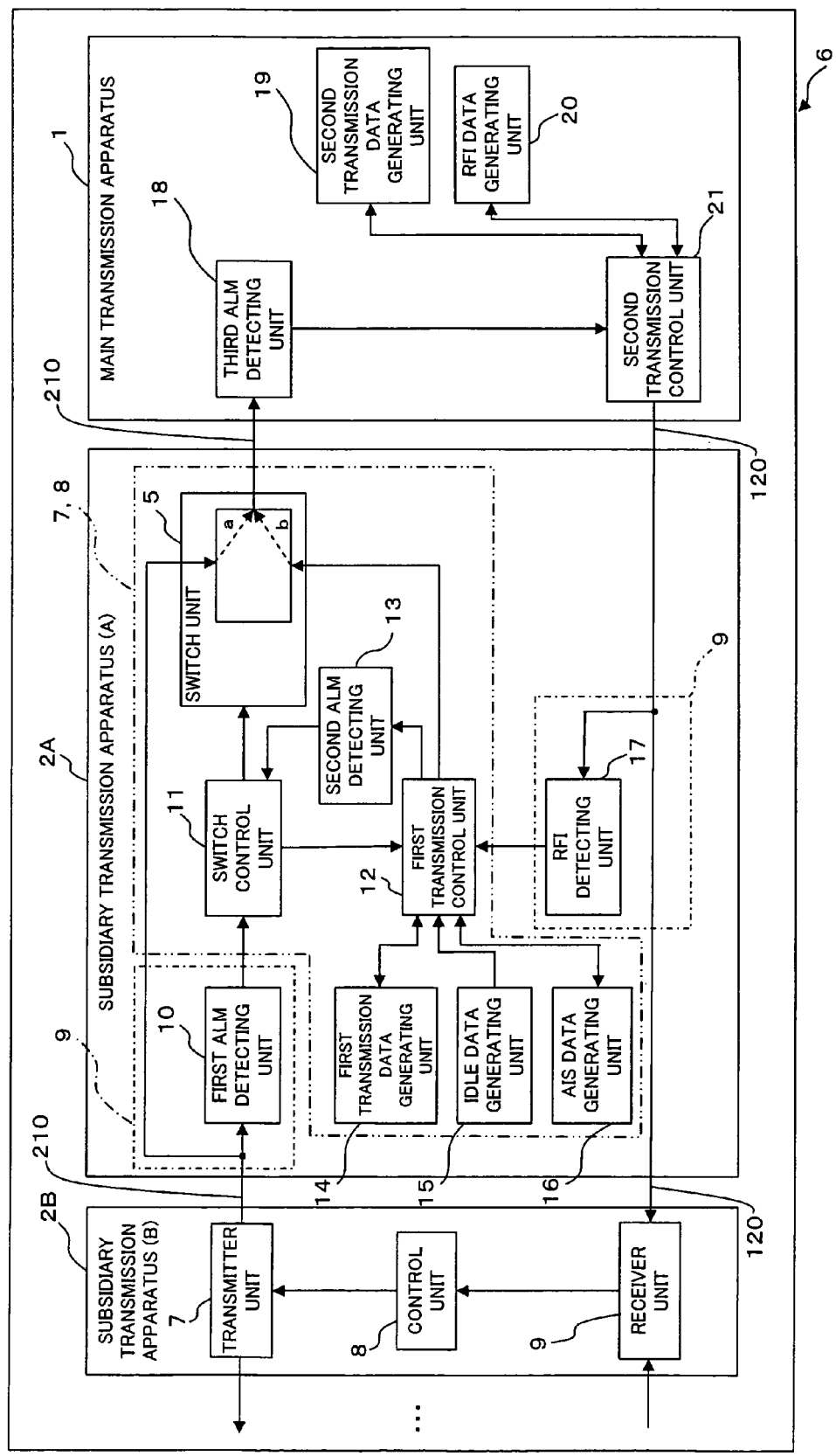
FIG. 2 is a block diagram illustrating constructions of a main transmission apparatus and subsidiary transmission apparatuses of FIG. 1.

Next, a description will be made of constructions of the main station 1 and the subsidiary stations 2 with reference to FIG. 2. FIG. 2 is a block diagram illustrating constructions of important parts of the main station 1 and the subsidiary station 2.

As shown in FIG. 2, the subsidiary station 2 includes: an RFI detecting unit 17; a first ALM (alarm) detecting unit 10; a switch unit 5; a switch control unit 11; a first transmission control unit 12; a second ALM detecting unit 13; a first transmission data generating unit 14; an IDLE (idle) data generating unit 15; and an AIS data generating unit 16.

Here, the RFI detecting unit (notification signal reception detecting unit) 17 detects whether or not an RFI (Remote Failure Indicator) signal (notification signal) is received. When detecting an RFI signal, the RFI detecting unit 17 outputs an RFI detection signal for notifying the first transmission control unit 12 of the detection.

The first ALM detecting unit 10 detects an ALM (alarm) signal (AIS) sent from another subsidiary station 2 through the upstream line 210. When detecting the alarm signal, the first ALM detecting unit 10 outputs a first ALM detection signal for notifying the switch control unit 11 of the detection.

When the RFI detecting unit 17 detects the reception of an RFI signal through the downstream line 120, the first transmission control unit 12 decides that the upstream line 210 is available. When the upstream line 210 is detected to be available, the first transmission control unit 12 sends a transmission signal addressed to the main station 1 onto the upstream line 210. For example, in accordance with an RFI detection signal from the RFI detecting unit 17 and a transmission control signal from the switch control unit 11, the first transmission control unit 12 employs data generated by any of the first transmission data generating unit 14, the IDLE data generating unit 15, and the AIS data generating unit 16, as transmission data to be sent to the main station 1, and sends the data to the main station 1 through the upstream line 210.

The first transmission data generating unit (transmission signal generating unit) 14 generates a transmission signal (for example, response data to be sent to the main station 1 and data to be uploaded to the main station 1) to be sent to the main station 1. The IDLE data generating unit 15 generates IDLE (idle) data for notifying the main station 1 that transmission of the above-mentioned alarm signal has been halted. This IDLE data can be replaced by other data as long as the data can notify the halt of transmission of the alarm signal. The AIS data generating unit (alarm generating unit) 16 generates data of AIS (Alarm Indication Signal) standardized by the SDH transmission scheme as the above-mentioned alarm signal.

The second ALM detecting unit 13 evaluates whether or not a transmission signal addressed to the main station 1, which signal is from the first transmission control unit 12, is an AIS from the AIS data generating unit 16. If the transmission signal from the first transmission control unit 12 is an AIS, the second ALM detecting unit 13 outputs a second ALM detection signal for notifying the switch control unit 11 that the AIS has been detected.

When the RFI detecting unit 17 detects the reception of an RFI signal, the switch control unit 11 halts adding an AIS onto the upstream line 210. After that, the switch control unit 11 controls the switch unit 5 into the add mode (described later) to add a transmission signal generated by the first transmission data generating unit 14 onto the upstream line 210. For example, in accordance with a first ALM detection signal from the first ALM detecting unit 10 and a second ALM detection signal from the second ALM detecting unit 13, the switch control unit 11 outputs, to the first transmission control unit 12, the above-mentioned transmission control signal for deciding data of which one of the first transmission data generating unit 14, the IDLE data generating unit 15, and the AIS data generating unit 16, should be employed as transmission data to be sent to the main station 1. The switch control unit 11 also outputs a switch control signal for selecting the mode of the switch to the switch unit 5.

Further, the switch unit 5, which is connected to the upstream line 210, has a through mode, in which a signal over the upstream line 210 is relayed (for example, a state indicated by the dotted arrow a in FIG. 2), and an add mode, in which either an AIS generated by the AIS data generating unit 16 or a transmission signal addressed to the main station 1 generated by the first transmission data generating unit 14 is added onto the upstream line 210 (for example, a state indicated by the dotted arrow b in FIG. 2). On the basis of the aforementioned switch control signal, the switch unit 5 switches between the two modes (through mode/add mode).

That is, the first ALM detecting unit 10 and the RFI detecting unit 17 function as the receiver unit 9 of FIG. 2. The receiver unit 9 receives data sent from the main station 1 and other subsidiary stations 2, and is capable of detecting an AIS from the subsidiary stations 2 and an RFI signal from the main station 1.

The switch control unit 11, the first transmission control unit 12, the second ALM detecting unit 13, the switch unit 5, the first transmission data generating unit 14, the IDLE data generating unit 15, and the AIS data generating unit 16 function as the transceiver unit 7 and the control unit 8 of FIG. 2. The transceiver unit 7 sends data generated by the control unit 8 or data transmitted from other subsidiary stations 2 to the main station 1 through the upstream line 210. For example, in cases where one or more subsidiary stations 2 are present over the communication path between the object subsidiary station 2 and the main station 1, the transceiver unit 7 is also capable of sending data addressed to the main station 1 to the subsidiary stations 2.

The control unit 8 performs switch control of the switch unit 5, transmission data generation, IDLE data generation, and AIS generation, on the basis of data received from the main station 1 and other subsidiary stations 2. That is, while no transmission request to the main station 1 is present, the control unit 8 functions as a generating means for generating an alarm signal addressed to the main station 1 which is sent out to the upstream line 210 of the bidirectional lines. The control unit 8 also functions as a control means which evaluates the state of use of the upstream line 210 based on whether or not a specific notification signal (for example, an RFI signal in the present embodiment), which is to be sent from the main station 1 onto the downstream line 120 in response to reception of an alarm signal, is received from the downstream line 120, and controls sending of a transmission signal addressed to the main station 1 out to the upstream line 210.

In this instance, the signal terminal unit 4 of FIG. 1 corresponds to a block containing the transmitter unit 7, the control unit 8, and the receiver unit 9. The above-described switch unit 5 corresponds to a part of, for example, the control unit 8.

Figure 3A:
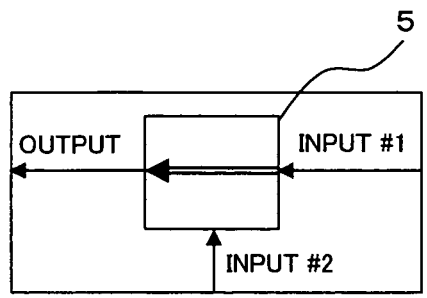
FIG. 3A and FIG. 3B are diagrams for describing operation modes of a switch unit.
Figure 3B:
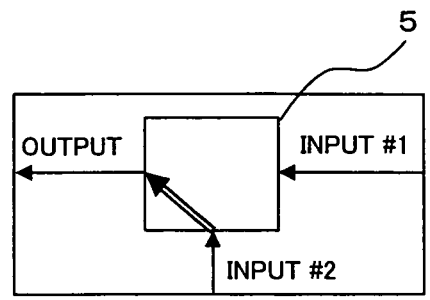

Here, referring to FIG. 3A and FIG. 3B, a description will be made of each mode of the switch unit 5. FIG. 3A illustrates the through mode of the above-mentioned operation modes, and FIG. 3B illustrates the add mode of the above-mentioned operation modes.

When the switch unit 5 is in the through mode as illustrated in FIG. 3A, the input #1 is employed as an output. In the communication system 6 of the present embodiment, the input #1 corresponds to a transmission signal from another subsidiary station 2. On the other hand, when the switch unit 5 is in the add mode as illustrated in FIG. 3B, the input #2 is employed as an output. In the communication system 6 of the present embodiment, the input #2 corresponds to a transmission signal generated by the subsidiary station 2 including the object switch unit 5.

According to the present embodiment, for example, in cases where the subsidiary station 2 receives an RFI signal from the main station 1 and where its own transmission request is not present, the switch control unit 11 controls the switch unit 5 into the through mode. Further, when no RFI signal is received, the switch control unit 11 controls the switch unit 5 into the through mode.

On the other hand, for example, in cases where the subsidiary stations 2 receive an RFI signal from the main station 1 and where its own transmission request is generated, the switch control unit 11 performs the above-mentioned switch control in accordance with the setting shown in the table of FIG. 4 on the basis of patterns (combinations) of the input #1 and the input #2 (a transmission signal from another subsidiary station 2 or a transmission signal from the object subsidiary station 2). FIG. 4 is a table for describing operation patterns (modes) of the switch unit 5.

For example, the switch control unit 11 evaluates the presence or absence of an RFI detection signal from the RFI detecting unit 17, and also evaluates the presence or absence of a first ALM detection signal from the first ALM detecting unit 10, thereby controlling the operation pattern of the switch unit 5.

That is, in cases where no RFI detection signal is detected and where the input #1 is not an AIS, it can be decided that another subsidiary station 2 has a transmission request, and thus, the switch unit 5 is controlled into the through mode. Here, it is preferable that the priority in the switch unit 5 be set so that a signal of the subsidiary station 2 which is far apart from the main station 1 is given higher priority in comparison with a signal of the subsidiary station 2 which is close to the main station 1. That is, the switch unit 5 selects and relays (lets a signal pass therethrough) the signal from the subsidiary station 2 distant from the main station 1 with higher priority in comparison with the signal (the signal from the above-mentioned input #2) from the object subsidiary station 2.

With this arrangement, even when transmission requests are generated from multiple subsidiary stations 2 at the same time, the switch unit 5 is controlled to select a signal (the above-mentioned input #1) from a subsidiary station 2 which is more distant from the main station 1 with higher priority, so that a collision between input #1 and input #2 is avoided, thereby realizing exclusive control with higher reliability.

On the other hand, when the aforementioned input #1 is an AIS, it can be decided that none of the other subsidiary stations 2 is generating a transmission request, so that a collision between the input #1 and the input #2 never occurs. Thus, the switch control unit 11 switches the switch unit 5 into the add mode to send a transmission signal (aforementioned input #2) of the object station 2 to the main station 1 through the upstream line 210.

Further, regardless of the presence or absence of an RFI detecting signal, when both of the input #1 and the input #2 are AISs, the switch unit 5 is controlled into the through mode.

That is, the switch unit 5 is controlled by the switch control unit 11 into the through mode or the add mode with a state change notification such as a first ALM detection signal and a second ALM detection signal as a trigger.

On the other hand, with attention paid to its important part, the main station 1 has, as shown in FIG. 2, a third ALM detecting unit 18, a second transmission data generating unit 19, an RFI data generating unit 20, and a second transmission control unit 21.

Here, the third ALM detecting unit 18 detects an AIS sent from the subsidiary stations 2 through upstream line 210. Upon detection of an AIS, the third ALM detecting unit 18 outputs a third ALM detection signal to the second transmission control unit 21 for notification.

Depending upon the presence or absence of the third ALM detection signal, the second transmission control unit 21 controls whether or not an RFI signal from the RFI data generating unit 20 is added (merged) to a transmission signal from the second transmission data generating unit 19 to the subsidiary stations 2. For example, when an AIS from a subsidiary station 2 is detected, an RFI signal is transmitted to the subsidiary stations 2 through the downstream line 120 as regulated by SDH or SONET.

The second transmission data generating unit 19 generates a transmission signal (for example, response data to the subsidiary stations 2 or contents data addressed to the subsidiary stations 2) addressed to the subsidiary stations 2. The RFI data generating unit 20 generates an RFI signal, which is defined by the SDH (or SONET) transmission scheme, as a standardized notification signal to be sent out by the main station 1 onto the downstream line 120 in response to reception of an AIS from a subsidiary station 2.

As described so far, according to the communication system 6 of the present embodiment, through the aforementioned bidirectional lines connecting the subsidiary stations 2 and the main station 1, a subsidiary station 2 which has no transmission request to the main station 1 sends an AIS to the main station 1 for realizing exclusive control among the multiple subsidiary stations 2. With this arrangement, a subsidiary station 2 that is sending an AIS is considered to have no transmission request to the main station 1, that is, the subsidiary station 2 does not use the upstream line 210. The other subsidiary stations 2 detect this situation, whereby the aforementioned exclusive control is realized.

That is, when all the subsidiary stations 2 send an AIS to the main station 1, the main station 1 generates an RFI signal which is to be sent in response to an AIS from the subsidiary stations 2, and sends the generated RFI signal to all the subsidiary stations 2. Hence, while one subsidiary station 2 is receiving an RFI signal from the main station 1, the subsidiary station 2 detects that none of the other subsidiary stations 2 is generating a transmission request. When an RFI signal stops being received, the subsidiary station 2 detects that any one of the subsidiary stations 2 generates a transmission request, whereby the aforementioned exclusive control is realized.

Further, when a transmission request is generated by the object subsidiary station 2, the subsidiary station 2 stops sending an AIS. As a result, since an AIS does not reach the main station 1, the main station 1 halts sending an RFI signal to the subsidiary stations 2, thereby notifying the other subsidiary stations 2 of the transmission request being generated. Then, the object subsidiary station 2, in which the transmission request is generated, switches the switch unit 5 into the add mode, thereby making possible transmission from the object subsidiary station 2 to the main station 1 through the upstream line 210.

That is, when a transmission request is generated in the object subsidiary station 2, the subsidiary station 2 needs to evaluate whether or not other subsidiary stations 2 are using the upstream line 210. The state of use of the upstream line 210 can be judged by evaluating whether or not the object subsidiary station 2 is receiving an RFI signal. For example, if the object subsidiary station 2 is receiving an RFI, it can be decided that none of the other subsidiary stations 2 are using the upstream line 210. If the object subsidiary station 2 is not receiving an RFI signal, it can be decided that the upstream line 210 is being used by another subsidiary station 2, and the object subsidiary station 2 refrains from transmission until an RFI signal is received.

Figure 5:
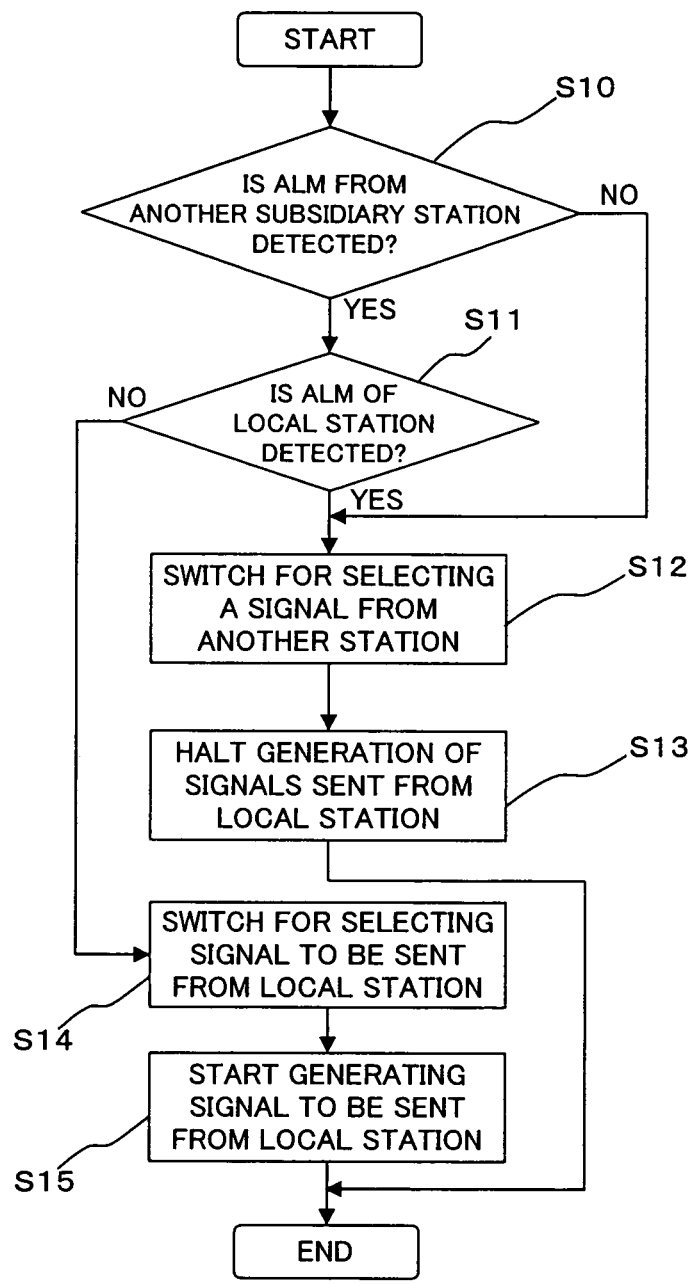
FIG. 5 is a flowchart for describing operations of multiple subsidiary transmission apparatuses.

Now, referring to the flowchart of FIG. 5 through FIG. 7, a description will be made of an operation performed on the main station 1 and the subsidiary stations 2 with the above-described construction according to the present embodiment.

Firstly, referring to the flowchart of FIG. 5, a description will be made of an operation of a subsidiary station 2.

In the beginning, in the object subsidiary station 2, the switch control unit 11 evaluates whether or not an AIS from another subsidiary station 2 has been received on the basis of a first ALM detection signal from the first ALM detecting unit 10 (step S10). If an AIS is being received from another subsidiary station 2 (YES route of step S10), the switch control unit 11 evaluates whether or not an AIS is generated in the object subsidiary station 2 on the basis of a second ALM detection signal from the second ALM detecting unit 13 (step S81).

As a result, if no AIS is generated in the object subsidiary station 2 (NO route of step S11), the first transmission control unit 12 judges that the object subsidiary station 2 has a transmission request, and the switch control unit 11 controls the switch unit 5 into the add mode to select a transmission signal generated in the object subsidiary station 2 (step S14). Then, the first transmission data generating unit 14 starts generating the transmission signal to be sent from the object subsidiary stations 2 to the main station 1 (step S15), and sends the generated transmission signal to the main station 1 through the upstream line 210.

On the other hand, on step S10, if no AIS is being received from another subsidiary station 2 (NO route of step S10), and if an AIS is generated in the object subsidiary station 2 (YES route of step S11), the switch control unit 11 controls the switch unit 5 of the object subsidiary station 2 into the through mode to select a transmission signal from the above-mentioned another subsidiary station (step S12). Then, even when a transmission request is generated in the object subsidiary station 2, generation of the transmission signal is halted (withheld) (step S13).

In this manner, switch control is performed with priority set in the switch unit 5 such that a transmission signal from a subsidiary station 2 distant from the main station 1 is given higher priority. Thus, even when two or more subsidiary stations 2 issue transmission requests at the same time, a transmission signal of the subsidiary station 2 that is distant from the main station 1 is selected, whereby exclusive control is realized with high reliability.

Next, referring to the flowchart of FIG. 6, an operation at the time of generating transmission data in a subsidiary station 2 will be described.

First of all, in the subsidiary station 2, the first transmission control unit 12 monitors whether or not the first transmission data generating unit 14 generates a transmission signal addressed to the main station 1, thereby evaluating whether or not data to be sent to the main station 1 is present (step S1) As a result, if there is no transmission signal to be sent to the main station 1 (NO route of step S1), the first transmission control unit 12 outputs an AIS (alarm signal) generated by the AIS data generating unit 16 to the switch unit 5 to send the AIS to the main station 1 through the upstream line 210 (step S6).

On the other hand, if there is a transmission signal to be sent to the main station 1 (YES route of step S1), the first transmission control unit 12 checks whether or not the RFI detecting unit 17 has detected an RFI signal from the main station 1 (step S2). If the RFI signal from the main station 1 has not been detected (NO route of step S2), the first transmission control unit 12 outputs an AIS generated by the AIS data generating unit 16 to the switch unit 5 to send the AIS to the main station 1 through the upstream line 210 (step S6).

If the RFI signal from the main station 1 has been detected (YES route of the step S2), the first transmission control unit 12 further evaluates whether or not the switch unit 5 inclines to the object subsidiary stations 2 (that is, add mode) based on a transmission control signal from the switch control unit 11 (step S3).

As a result, if the switch unit 5 is in the add mode (YES route of step S3), the first transmission control unit 12 outputs a transmission signal addressed to the main station 1 that is generated by the first transmission data generating unit 14 to the switch unit 5, and sends the transmission signal to the main station 1 through the upstream line 210 (step S4). On the other hand, if the switch unit 5is not in the add mode (that is, in the through mode) (No route of step S3), the first transmission control unit 12 employs the above-mentioned IDLE data generated by the IDLE data generating unit 15, and outputs the IDLE data to the switch unit 5 (step S5). With the IDLE data thus output, the switch control unit 11 detects that a second ALM detection signal is stopped being received from a second ALM detecting unit 13. Then, the switch control unit 11 switches the state of the switch unit 5 from the through mode to the add mode, whereby the IDLE data is sent to the main station 1 through the upstream line 210.

Next, referring to the flowchart of FIG. 7, an operation of the main station 1 will be described.

First of all, in the main station 1, the second transmission control unit 21 evaluates whether or not the third ALM detecting unit 18 has detected an AIS from a subsidiary station 2 on the basis of the above-mentioned third ALM detection signal (step S7). If the AIS has not been detected (NO route of step S7), the second transmission control unit 21 employs a transmission signal addressed to the subsidiary stations 2 that is generated by the second transmission data generating unit 19 and sends the transmission signal to the subsidiary stations 2 through the downstream line 120 (step S9). That is, as described above, if no AIS from a subsidiary station 2 is detected, an RFI signal is not sent to the subsidiary stations 2.

On the other hand, if an AIS from a subsidiary station 2 has been detected (YES route of step S7), the second transmission control unit 21 merges an RFI signal generated by the RFI data generating unit 20 with a transmission data generated by the second transmission data generating unit 19, and sends the thus merged signal and data to the subsidiary stations 2 through the downstream line 120 (step S8).

The above-described flow makes possible exclusive control between the subsidiary stations 2 and the main station 1, so that the path of the upstream line 210 can be automatically established.

Figure 8:
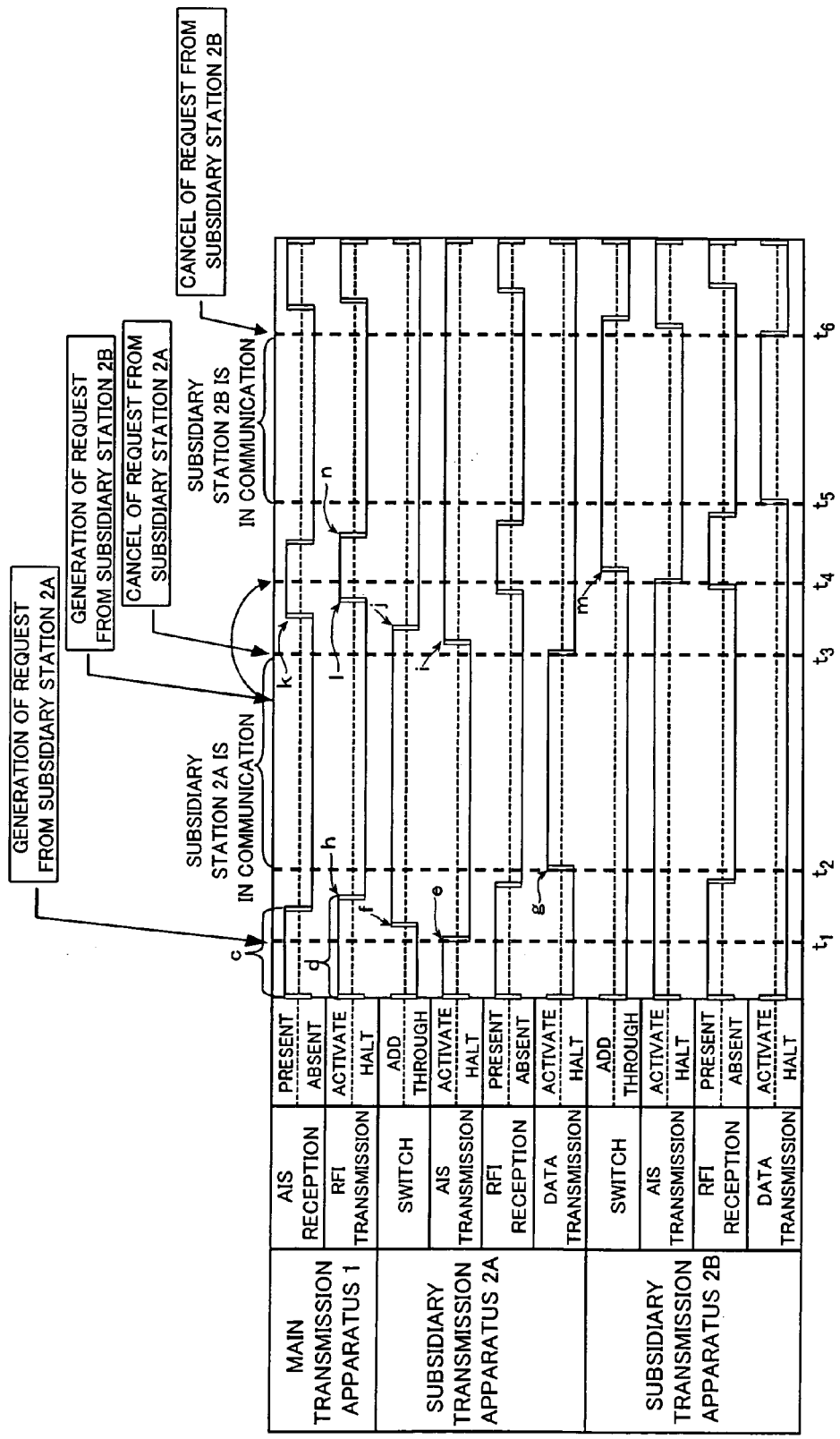
FIG. 8 is a timing chart for describing the timing of the communication method according to one preferred embodiment of the present invention.
Figure 9:
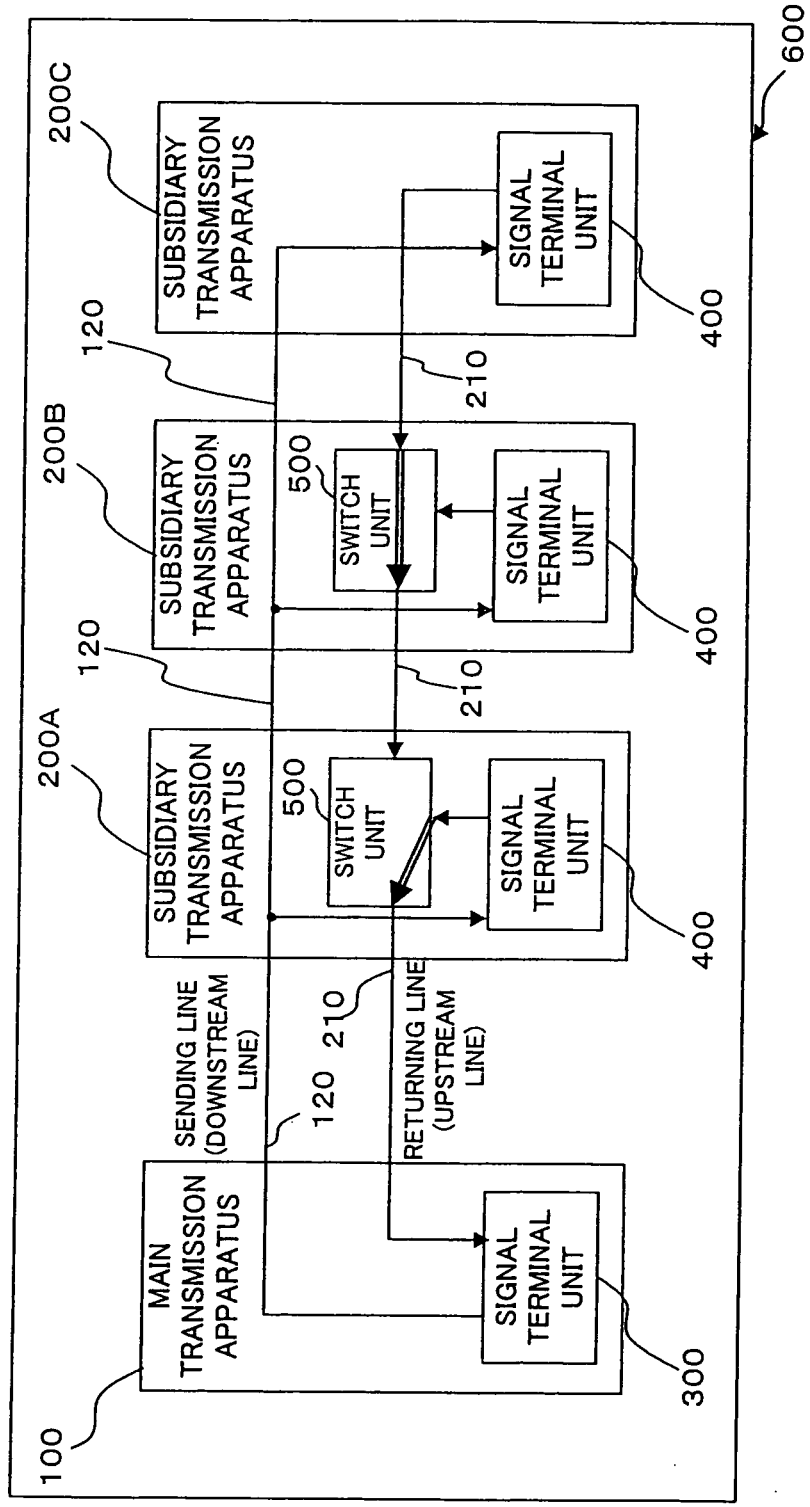
FIG. 9 is a block diagram illustrating a construction of a previous point-to-multipoint communication system.

With the above-described operation as a precondition, the sequence of exclusive control performed between the subsidiary stations 2 and the main station 1 will be described with reference to FIG. 8, which is a timing chart for describing the timing in the communication method according to one preferred embodiment of the present invention. Here, as an example of the above-mentioned sequence, a description will be made of a case in which a transmission request is generated by the subsidiary station 2A and by the subsidiary station 2B in this order under a condition that no transmission request has been generated in the subsidiary stations 2 so far. $t_1$, $t_2$, $t_3$, $t_4$, $t_5$, and $t_6$ ($t_1 < t_2 < t_3 < t_4 < t_5 < t_6$) of FIG. 8 designate timings with which specified processes are performed.

First of all, if no transmission request is generated in any of the subsidiary stations 2, each of the subsidiary stations 2 generates an AIS. Here, if the object subsidiary station 2 generates an AIS, the switch unit 5 of the object subsidiary station 2 is in the through mode due to the already described mode setting (corresponding to the processing of YES route of step S11 of FIG. 5). Thus, an AIS from the most downstream subsidiary station 2 (for example, the subsidiary station 2B) reaches the main station 1 through the upstream line 210 as a valid AIS. Accordingly, while receiving the AIS (reference character c), the main station 1 generates an RFI signal as a response and sends the RFI signal to the subsidiary stations 2 through the downstream line 120 (see reference character d: corresponding to the processing of YES route of step S7 to the processing of step S8 of FIG. 7).

Under this state, if a transmission request is generated in the subsidiary station 2A at time $t_1$, the subsidiary station 2A halts generating and sending an AIS (see reference character e). As a result, an AIS of the object subsidiary station 2A stops being detected by the second ALM detecting unit of the object subsidiary station 2A, so that the switch unit 5 of the subsidiary station 2A is controlled into the add mode (see reference character f: corresponding to NO route of the step S11 through step S14 of FIG. 5).

In this instance, since the subsidiary station 2A receives an RFI signal from the main station 1, the subsidiary station 2A recognizes that no transmission request is generated in the other subsidiary station 2 (2B). Then, the subsidiary station 2A starts generating data to be sent from the object subsidiary station 2A (see reference g) and sends the generated data out to the upstream line 210 through the switch unit 5 (in the add mode) (see time $t_2$: corresponding to YES route of step S2 and S3 through step S4 of FIG. 6).

Figure 7:
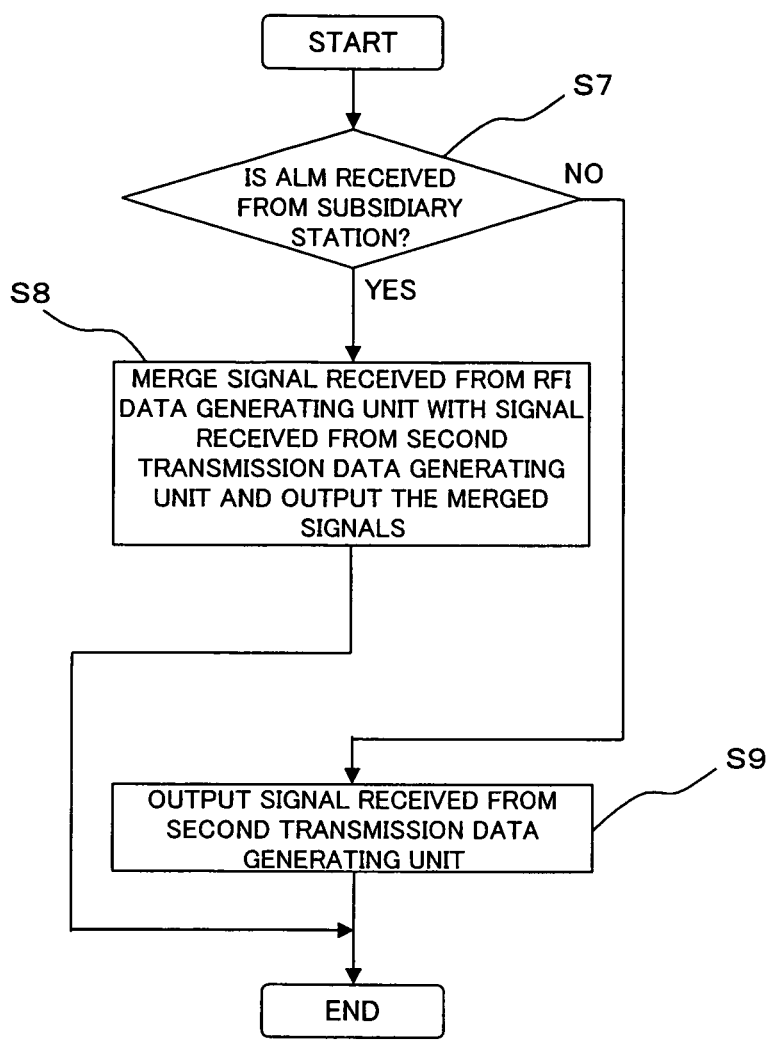
FIG. 7 is a flowchart for describing an operation of the main transmission apparatus of FIG. 1 and FIG. 2.

On the other hand, since the subsidiary station 2A halts sending an AIS as described above, and controls the switch unit 5 into the add mode, the AIS stops arriving at the main station 1 through the upstream line 210, and the main station 1 thus stops generating and sending an RFI signal (see reference character h: corresponding to NO route of step S7 of FIG. 7). As a result, since the RFI signal stops arriving at the other subsidiary station 2B, the subsidiary station 2B recognizes that another subsidiary station 2 (2A) is using the upstream line 210.

Figure 6:
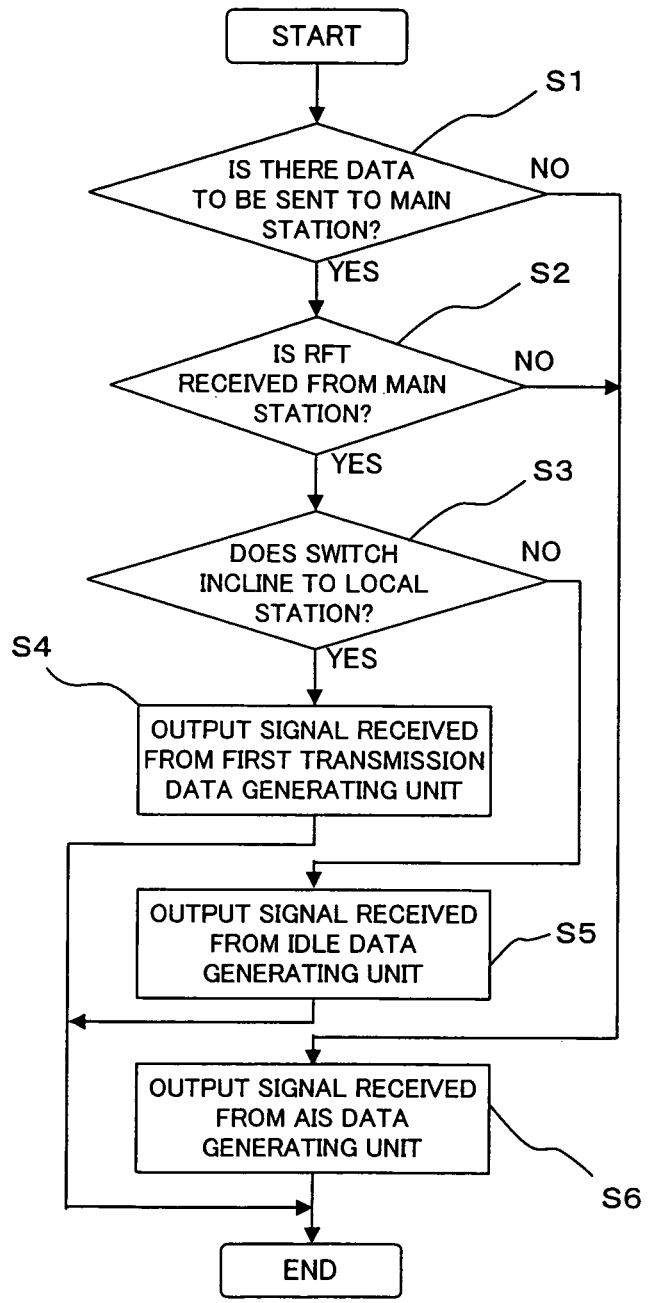
FIG. 6 is a flowchart for describing an operation of the subsidiary transmission apparatuses of FIG. 1 and FIG. 2.

After that, if the subsidiary station 2A performs data transmission to the main station 1 from time $t_2$ to time $t_3$ (canceling of a transmission request), for example, the subsidiary station 2A restarts generating an AIS (see reference character i; corresponding to the processing from NO route of step S1 to the step S6 of FIG. 6). This switches the switch unit 5 of the subsidiary station 2A from the add mode to the through mode (see reference character j: corresponding to the processing from YES route of step S1 through step S12), and an AIS from the downstream subsidiary station 2B reaches the main station 1 through the upstream line 210 again.

Accordingly, since an AIS restarts arriving at the main station 1 through the upstream line 210 (see reference character k), the main station 1 restarts generating and sending an RFI signal (see reference character 1; corresponding to the processing from YES route of step S7 to step S8 of FIG. 7).

Here, it is assumed that a transmission request is generated in the subsidiary station 2B while the subsidiary station 2A and the main station 1 are communicating through the upstream line 210 as described above. In this case, at the time the transmission request is generated, the subsidiary station 2B does not receive an RFI signal from the main station 1 as described above. Thus, the subsidiary station 2B recognizes that another subsidiary station 2 (2A), than the object station 2B, is using the upstream line 210, and refrains from generating transmission data addressed to the main station 1 (keeps generating and sending an AIS).

After that, communication between the main station 1 and the subsidiary station 2A is completed, and the main station 1 restarts sending an RFI signal. Since the RFI signal starts reaching the subsidiary station 2B from time $t_4$, the subsidiary station 2B recognizes that the upstream line 210 is usable, and halts generating and sending an AIS at this point in time (time $t_4$). This makes the switch unit 5 of the subsidiary station 2B go into the add mode (see reference character m), and the object subsidiary station 2B starts generating and sending its own transmission data (see time $t_5$ through $t_6$: corresponding to the processing from NO route of step S11 through steps S14 and S15 of FIG. 5).

On the other hand, as described above, since the subsidiary station 2B halts sending an AIS and controls the switch unit 5 into the add mode, the AIS stops arriving at the main station 1 through the upstream line 210. Thus, the main station 1 halts generating and sending an RFI signal (see reference character n: corresponding to the processing of NO route of step S7 of FIG. 7). As a result, an RFI signal does not reach the other subsidiary station 2 (2A) than the subsidiary station 2B that is in communication, so that the subsidiary station 2 (2A) recognizes that another subsidiary station 2 (2B) than the object subsidiary station 2 is using the upstream line 210.

With this arrangement, in the communication system 6, it is possible for the object subsidiary station to easily evaluate whether or not another subsidiary station is using the aforementioned upstream line 210. The state of use of the upstream line 210 is easily detected. Further, the subsidiary station 2 sends a transmission signal addressed to the above-mentioned main station 1 out to the upstream line 210 when the subsidiary station 2 decides that the upstream line 210 is usable. Thus, at the time a communication path (communication path using the upstream line) is established, the necessity of a maintenance engineer who manually controls the switch unit 5 of the subsidiary stations 2 while checking the state of use of the upstream line is eliminated.

That is, it is possible for the object subsidiary station 2 to simply and easily evaluate whether or not another subsidiary station 2 is using the upstream line 210, without the necessity of complicated negotiation processing, and a communication path (upstream circuit 210) between the object subsidiary station 2 and the main station 1 is automatically established.

Further, while the object subsidiary station 2 is communicating with the main station 1 through the upstream line 210, the main station 1 halts sending an RFI signal, and the other subsidiary stations 2 are capable of detecting that the RFI signal is not received. Thus, it is possible to prohibit the other subsidiary stations 2 from sending transmission signals to the main station 1 through the upstream line 210, so that exclusive control is realized in the communication system 6.

Still further, the aforementioned alarm signal is an AIS defined in the SDH transmission scheme, and the notification signal is an RFI signal defined in the SDH (or SONET) transmission scheme. Hence, the switch control of the switch unit 5 provided for the subsidiary station 2 can be performed without preparing a dedicated line for transceiving a control signal for the switch unit 5.

Further, the present invention should by no means be limited to the above-illustrated embodiment, and various changes or modifications may be suggested without departing from the gist of the invention.

For example, the above-mentioned alarm signal and notification signal should by no means be limited to an AIS signal and an RFI signal, and any other signals having like relationship therebetween are also applicable.

What is claimed is:

1. A communication method for a point-to-multipoint communication system including: a main transmission apparatus; a pair of bidirectional lines connected to the main transmission apparatus; and a plurality of subsidiary transmission apparatuses connected to the bidirectional lines, said communication method comprising:

on a respective subsidiary transmission apparatus of the plurality of subsidiary transmission apparatuses,
transmitting a response request signal, being received by the respective subsidiary transmission apparatus from a downstream subsidiary transmission apparatus, to the main transmission apparatus through an upstream line of the bidirectional lines when a transmission request by the respective subsidiary transmission apparatus to the main transmission apparatus is absent during the receiving of the response request signal by the respective subsidiary transmission apparatus from the downstream subsidiary transmission apparatus, and
halting the transmission of the response request signal when a transmission request to the main transmission apparatus is generated by the respective subsidiary transmission apparatus during the receiving of the response request signal by the respective subsidiary transmission apparatus from the downstream subsidiary transmission apparatus, on the main transmission apparatus,
sending, while receiving the response request signal through the upstream line, a specified notification signal, which is to be sent out in response to the reception of the response request signal, to a downstream line of the bidirectional lines, and halting, when no longer receiving the response request signal, the sending of the specified notification signal, and
on each of the plurality of subsidiary transmission apparatuses,
determining, based on the presence or absence of reception of the specified notification signal from the downstream line, whether another subsidiary transmission apparatus uses the upstream line.

2. A communication method as set forth in claim 1, wherein each respective subsidiary transmission apparatus decides that the upstream line is usable, while receiving the specified notification signal through the downstream line.

3. A communication method as set forth in claim 2, wherein upon decision that the upstream line is usable by a respective subsidiary transmission apparatus, said respective subsidiary transmission apparatus sends a transmission signal addressed to the main transmission apparatus out to the upstream line.

4. A communication method as set forth in claim 3,
wherein the response request signal is an AIS (Alarm Indication Signal) defined by the SDH transmission scheme, and
wherein the specified notification signal is an RFI (Remote Failure Indicator) signal defined by the SDH transmission scheme.

5. A communication method as set forth in claim 2,
wherein the response request signal is an AIS (Alarm Indication Signal) defined by the SDH (Synchronous Digital Hierarchy) transmission scheme, and
wherein the specified notification signal is an RFI (Remote Failure Indicator) signal defined by the SDH transmission scheme.

6. A communication method as set forth in claim 1,
wherein the response request signal is an AIS (Alarm Indication Signal) defined by the SDH transmission scheme, and
wherein the specified notification signal is an RFI (Remote Failure Indicator) signal defined by the SDH transmission scheme.

7. A respective subsidiary transmission apparatus for a point-to-multipoint communication system which includes a main transmission apparatus, a pair of bidirectional lines connected to the main transmission apparatus, and a plurality of subsidiary transmission apparatuses connected to the bidirectional lines, said respective subsidiary transmission apparatus comprising:

a transmitter that transmits a response request signal, being received by the respective subsidiary transmission apparatus from a downstream subsidiary transmission apparatus, to the main transmission apparatus through an upstream line of the bidirectional lines when a transmission request by the respective subsidiary transmission apparatus to the main transmission apparatus is absent during the receiving of the respective subsidiary transmission apparatus from the downstream subsidiary transmission apparatus, and halts the transmission of the response request signal when, a transmission request to the main transmission apparatus is generated by the respective subsidiary transmission apparatus during the receiving of the respective subsidiary transmission apparatus from the downstream subsidiary transmission apparatus; and a controller that determines whether another subsidiary transmission apparatus uses the upstream line depending on whether a specified notification signal, which the main transmission apparatus should send to a downstream line of the bidirectional lines in response to reception of the response request signal, is received from the downstream line, and that controls sending of a transmission signal addressed to the main transmission apparatus out to the upstream line.

8. The respective subsidiary transmission apparatus as set forth in claim 7, wherein said transmitter includes: a first generator that generates the response request signal; a second generator that generates the transmission signal addressed to the main transmission apparatus; and a switch unit having a through mode in which a signal over the upstream line is made to pass through and an add mode in which either the response request signal generated by said first generator or the transmission signal addressed to the main transmission apparatus generated by said second generator is added to the upstream line.

9. The respective subsidiary transmission apparatus as set forth in claim 8, wherein the response request signal is an AIS (Alarm Indication Signal) defined by the SDH transmission scheme, and wherein the specified notification signal is an RFI (Remote Failure Indicator) signal defined by the SDH transmission scheme.

10. The respective subsidiary transmission apparatus as set forth in claim 7, wherein the response request signal is an AIS (Alarm Indication Signal) defined by the SDH transmission scheme, and wherein the specified notification signal is an RFI (Remote Failure Indicator) signal defined by the SDH transmission scheme.

* * * * *

UNITED STATES PATENT AND TRADEMARK OFFICE
CERTIFICATE OF CORRECTION

| | | |
|---|---|---|
| PATENT NO. | : 8,576,729 B2 | Page 1 of 1 |
| APPLICATION NO. | : 11/498049 | |
| DATED | : November 5, 2013 | |
| INVENTOR(S) | : Jun Wakabayashi et al. | |

It is certified that error appears in the above-identified patent and that said Letters Patent is hereby corrected as shown below:

In the Claims

In Column 15, Line 15 (Approx.), In Claim 7, delete "when," and insert -- when --, therefor.

Signed and Sealed this
Eleventh Day of February, 2014

Michelle K. Lee
*Deputy Director of the United States Patent and Trademark Office*